(12) United States Patent
Weiss et al.

(10) Patent No.: US 10,155,292 B2
(45) Date of Patent: Dec. 18, 2018

(54) POWER-TOOL COOLING APPARATUS

(71) Applicant: Robert Bosch GmbH, Stuttgart (DE)

(72) Inventors: Michael Weiss, Stuttgart (DE); Torsten Riek, Leinfelden (DE); Andreas Schlegel, Leinfelden-Echterdingen (DE); Steffen Tiede, Herrenberg (DE); Christian Lang, Stuttgart (DE); Hardy Schmid, Stuttgart (DE); Juergen Dietel, Stuttgart (DE); Benjamin Nikolas Fischle, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 672 days.

(21) Appl. No.: 14/695,932

(22) Filed: Apr. 24, 2015

(65) Prior Publication Data

US 2015/0306719 A1 Oct. 29, 2015

(30) Foreign Application Priority Data

Apr. 25, 2014 (DE) .................. 10 2014 207 867

(51) Int. Cl.
| | |
|---|---|
| B23Q 11/12 | (2006.01) |
| B23Q 11/10 | (2006.01) |
| B25F 5/00 | (2006.01) |

(52) U.S. Cl.
CPC ........ B23Q 11/126 (2013.01); B23Q 11/1092 (2013.01); B23Q 11/127 (2013.01); B25F 5/008 (2013.01)

(58) Field of Classification Search
CPC ... B25F 5/008; B23Q 11/1092; B23Q 11/126; B23Q 11/127

USPC ............................................ 173/46; 165/80.4
See application file for complete search history.

(56) References Cited

U.S. PATENT DOCUMENTS

| 7,166,939 B2 | 1/2007 | Voigt et al. | |
|---|---|---|---|
| 2006/0175915 A1* | 8/2006 | Voigt ..................... | B25F 5/008 310/58 |
| 2011/0180286 A1* | 7/2011 | Oomori ................... | B25F 5/008 173/20 |
| 2011/0308828 A1* | 12/2011 | Shinma .................. | B25F 5/008 173/114 |
| 2012/0066916 A1* | 3/2012 | Heinzelmann .......... | B25F 5/008 30/381 |
| 2013/0199574 A1* | 8/2013 | Baker ..................... | B08B 15/04 134/21 |

FOREIGN PATENT DOCUMENTS

| CN | 1249225 A | 4/2000 |
|---|---|---|
| CN | 1700969 A | 11/2005 |
| CN | 102123832 A | 7/2011 |
| DE | 39 42 083 A1 | 6/1991 |
| DE | 196 00 339 C1 | 12/1996 |
| DE | 698 16 512 T2 | 4/2004 |

(Continued)

Primary Examiner — Hemant M Desai
Assistant Examiner — Valentin Neacsu
(74) Attorney, Agent, or Firm — Maginot, Moore & Beck LLP

(57) ABSTRACT

A power-tool cooling apparatus for a portable power tool comprises at least one cooling unit configured to generate a cooling fluid flow to cool a drive unit of the portable power tool, and at least one further cooling unit configured to generate a further cooling fluid flow. The at least one further cooling unit is designed to differ from the at least one cooling unit.

19 Claims, 7 Drawing Sheets

(56) References Cited

FOREIGN PATENT DOCUMENTS

| | | |
|---|---|---|
| DE | 10 2005 007 546 A1 | 8/2006 |
| DE | 10 2005 062 697 A1 | 7/2007 |
| DE | 10 2007 038 555 A1 | 2/2009 |
| EP | 1491290 A1 * 12/2004 | ............. B24B 23/00 |

* cited by examiner

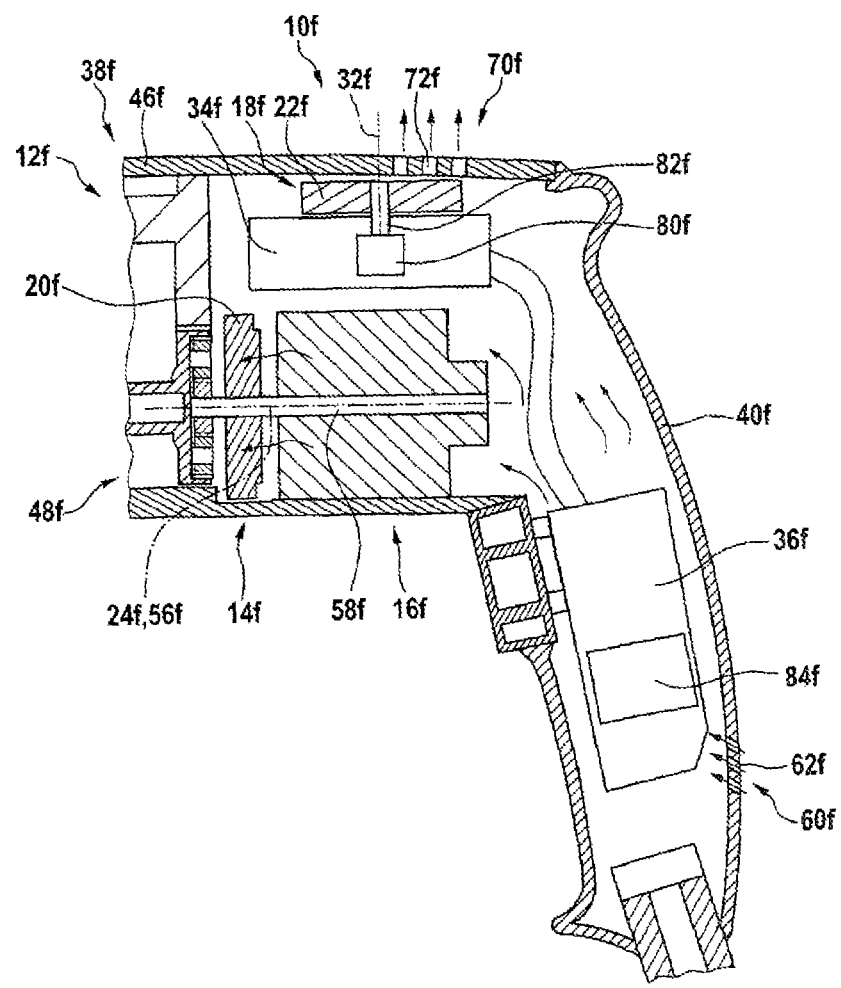

POWER-TOOL COOLING APPARATUS

This application claims priority under 35 U.S.C. § 119 to patent application no. DE 10 2014 207 867.9, filed on Apr. 25, 2014 in Germany, the disclosure of which is incorporated herein by reference in its entirety.

BACKGROUND

DE 10 2005 007 546 A1 has already disclosed a power-tool cooling apparatus for a portable power tool, wherein the power-tool cooling apparatus has a cooling unit which generates a cooling fluid flow and which serves for cooling a drive unit of the portable power tool, and said power-tool cooling apparatus has a passive cooling body which is cooled by means of the cooling fluid flow of the cooling unit.

Furthermore, DE 196 00 339 C1 has already disclosed a power-tool cooling apparatus for a portable power tool, wherein the power-tool cooling apparatus has a cooling unit which generates a cooling fluid flow and which serves for cooling a drive unit of the portable power tool. In this case, the cooling unit has an individual double fan impeller which is provided for providing a cooling fluid flow for cooling the drive unit and a further cooling fluid flow for cooling a gearing unit of the portable power tool.

SUMMARY

The disclosure is based on a power-tool cooling apparatus for a portable power tool, having at least one cooling unit which generates a cooling fluid flow and which serves at least for cooling a drive unit of the portable power tool.

It is proposed that the power-tool cooling apparatus comprises at least one further cooling unit which serves for generating a further cooling fluid flow and which is designed to differ from the cooling unit for cooling the drive unit. Here, the expression "cooling unit" is intended in particular to define a unit which is provided specifically for extracting and/or dissipating heat (thermal energy) from an element and/or a unit, in particular by means of convection. "Provided" is to be understood in particular to mean specially configured and/or specially equipped. Where it is stated that an element and/or a unit is provided for a particular function, this is to be understood in particular to mean that the element and/or the unit performs(s) and/or carries (carry) out said particular function in at least one usage and/or operating state. The cooling unit for cooling the drive unit is in particular in the form of a main cooling unit. The cooling unit for cooling the drive unit is preferably in the form of a fan impeller unit. Thus, the cooling unit for cooling the drive unit is provided at least for generating a cooling fluid flow which dissipates at least thermal energy from the drive unit. Here, the cooling unit is preferably in the form of an active cooling unit. It is however also conceivable for the cooling unit to be of some other configuration that appears expedient to a person skilled in the art, and to be configured for example as a cooling pump unit, as a heat exchanger unit or the like.

The further cooling unit is in particular in the form of a secondary cooling unit. Here, the further cooling unit is preferably in the form of a fan impeller unit. Thus, the further cooling unit is preferably in the form of an active cooling unit. It is however also conceivable for the further cooling unit to be of some other configuration that appears expedient to a person skilled in the art, and to be configured for example as a cooling pump unit, as a heat exchanger unit or the like. The further cooling unit is preferably provided at least for generating a cooling fluid flow which dissipates at least thermal energy from at least one unit of the portable power tool that preferably differs from the drive unit. That unit of the portable power tool to which the cooling fluid flow of the further cooling unit is assigned may in this case be in the form of an electronics unit, a percussive mechanism unit, a gearing unit, a control unit, an electric output unit or as some other unit that appears expedient to a person skilled in the art. It is however also conceivable for the further cooling unit to be provided at least for generating a cooling fluid flow which dissipates at least thermal energy from the drive unit.

To make it possible to realize an advantageous level of cooling power, the cooling unit and/or the further cooling unit may each have at least one additional, passive cooling body which is arranged on the unit to which the respective cooling fluid flow of the cooling unit and/or of the further cooling unit is assigned. A "cooling body" is to be understood in particular to mean an element and/or a unit which are/is designed in targeted fashion for cooling further components, in particular an electronics unit, and which are/is in particular in thermal and preferably direct mechanical contact with said components. For the dissipation of thermal energy to the surroundings, the cooling body has in particular a surface area which is at least five times, in particular at least 10 times, advantageously at least 20 times and particularly advantageously at least 50 times larger than that of a cube of identical volume, and comprises in particular at least 3, in particular at least 10 and advantageously at least 20 cooling fins. In this case, a "cooling fin" is to be understood to mean an elongate, in particular wall or bar-like component which is composed of a heat-conducting material and which is connected, in particular integrally, to a main body of the cooling body at least at one location. A "main body of the cooling body" is to be understood in particular to mean a component which is composed of a heat-conducting material and which has at least one surface which is in thermal contact with a component to be cooled. It is preferably the case that the entire cooling body is composed of a heat-conducting material, and has in particular a plate-shaped main body from which cooling fins extend, preferably only on one side of the main body. In particular, the cooling body is configured especially for heat transfer to an air flow flowing along at least one of the surfaces of the cooling body, and preferably has flow ducts through which an air flow for cooling the cooling body can be conducted. "Integrally" is to be understood in particular to mean at least cohesively connected, for example by way of a welding process, an adhesive bonding process, an injection process and/or some other process that appears expedient to a person skilled in the art, and/or is advantageously to be understood to mean formed in one piece, for example by production from one casting and/or by production in a single-component or multi-component injection process, and advantageously from a single blank.

The expression "designed to differ from" is to be understood here in particular to mean a configuration of an element and/or of a unit relative to a configuration of a further element and/or of a further unit, wherein the element and/or the unit are/is formed in particular separately from the further element and/or further unit. Thus, the further cooling unit is preferably formed separately from the cooling unit. Here, the cooling unit may be in direct contact with the further cooling unit, in particular for a drive of cooling fluid flow-generating elements of the cooling unit and the further cooling unit. In an alternative refinement of the power-tool cooling apparatus, the cooling unit has a dedicated unit for providing drive, and the further cooling unit likewise has a dedicated unit for providing drive. By means of the configuration according to the disclosure of the power-tool cooling apparatus, it is advantageously possible for an additional cooling fluid flow to be generated which can be used for intense cooling of components of the portable power tool. Furthermore, it can advantageously be ensured, in the event of a failure of the cooling unit or of the further cooling unit, that at least one cooling fluid flow for cooling components of the portable power tool can be generated. Thus, it is advantageously possible to ensure a high level of safety against overheating of components of the portable power tool.

It is furthermore proposed that the cooling unit has at least one cooling fluid flow-generating element which is formed separately from a cooling fluid flow-generating element of the further cooling unit. The cooling fluid flow-generating unit of the cooling unit is preferably in the form of a fan impeller. It is however also conceivable for the cooling fluid flow-generating element of the cooling unit to be of some other configuration that appears expedient to a person skilled in the art, and to be configured for example as a cooling fluid pump element or the like. The cooling fluid flow-generating element of the further cooling unit is preferably in the form of a fan impeller. It is however also conceivable for the cooling fluid flow-generating element of the further cooling unit to be of some other configuration that appears expedient to a person skilled in the art, and to be configured for example as a cooling fluid pump element or the like. By means of the configuration according to the disclosure of the power-tool cooling apparatus, it is advantageously possible to provide two separate cooling fluid flows for cooling components of the portable power tool. Furthermore, it is advantageously possible for two separate cooling air ducts to each be supplied with a cooling fluid flow. It is thus possible to realize reliable cooling of components of the portable power tool.

It is also proposed that the cooling unit has at least one cooling fluid flow-generating element which, viewed along an axis of rotation of the cooling unit, is arranged so as to be spaced apart relative to a cooling fluid flow-generating element of the further cooling unit. "Arranged so as to be spaced apart" is to be understood here in particular to mean an arrangement of an element and/or of a unit relative to a further element and/or a further unit, wherein a smallest spacing between the element and/or the unit and the further element and/or the further unit is in particular greater than 0.01 mm, preferably greater than 0.1 mm, and particularly preferably greater than 1 mm, in particular viewed along a direction running at least substantially parallel to the axis of rotation of the cooling unit. The cooling fluid flow-generating element of the cooling unit and the cooling fluid flow-generating element of the further cooling unit are preferably arranged on a common drive axis. The power-tool cooling apparatus advantageously comprises at least one cooling fluid intake opening, which is assigned to the cooling unit, and at least one cooling fluid intake opening, which is assigned to the further cooling unit. By means of the configuration according to the disclosure, it is thus advantageously possible to realize a delivery, in particular an intake, of cooling fluid at two different positions. It is thus advantageously possible to realize an advantageous level of cooling power for cooling components of the portable power tool. In particular, by virtue of in each case one cooling fluid intake opening being assigned to the respective cooling unit, it is advantageously possible for a large total cooling fluid flow rate to be delivered for the purposes of cooling components of the portable power tool.

It is furthermore proposed that the cooling unit and the further cooling unit can be driven by means of the drive unit. The drive unit is preferably in the form of an electric motor. It is however also conceivable for the drive unit to be of some other configuration that appears expedient to a person skilled in the art, and to be configured for example as a hybrid drive unit, as a combustion drive unit, as a pneumatic drive unit, as a hydraulic drive unit or the like. By means of the configuration according to the disclosure of the power-tool cooling apparatus, it is advantageously possible to dispense with components for driving the cooling unit and for driving the further cooling unit. It is furthermore advantageously possible to realize a compact arrangement of the cooling unit and of the further cooling unit.

The power-tool cooling apparatus advantageously comprises at least one drive power transmission unit which is provided for connecting the cooling unit in terms of drive to the further cooling unit. "Connected in terms of drive" is to be understood here in particular to mean a connection between at least two elements and/or at least two units, by means of which connection a transmission of drive power from one element and/or one unit to the other element and/or the other unit can be realized, in particular by way of a mechanical connection of the elements and/or of the units. By means of the configuration according to the disclosure, it is advantageously possible to attain a high level of flexibility with regard to the possibilities for arrangement of the cooling unit relative to the further cooling unit. Furthermore, drive power of the drive unit can be utilized in an advantageous manner for driving the cooling unit and the further cooling unit.

In one refinement of the power-tool cooling apparatus according to the disclosure, the drive power transmission unit has at least one toothing for connecting the cooling unit in terms of drive to the further cooling unit. Here, it is conceivable for the toothing to be formed as part of a gearing unit of the drive power transmission unit, which gearing unit is provided for realizing a connection between at least one drive element, in particular a drive shaft, of the cooling unit and a drive element, in particular a drive shaft, of the further cooling unit. The toothing is preferably in the form of an external toothing which is arranged on an outer circumference of the cooling fluid flow-generating element of the cooling unit and/or of the cooling fluid flow-generating element of the further cooling unit. Here, the toothing may be arranged on the cooling fluid flow-generating element of the cooling unit and/or on the cooling fluid flow-generating element of the further cooling unit by means of a positively locking, non-positively locking and/or cohesive connection. It is particularly preferable for a part of the toothing to be formed integrally with the cooling fluid flow-generating element of the cooling unit, and a part of the toothing is preferably formed integrally with the cooling fluid flow-generating element of the further cooling unit. By means of the configuration according to the disclosure, it is possible in a structurally simple manner to realize a connection in terms of drive between the cooling unit and the further cooling unit.

In a further refinement of the power-tool cooling apparatus according to the disclosure, the drive power transmission unit has at least one wraparound element for connecting the cooling unit in terms of drive to the further cooling unit. A "wraparound element" is to be understood here in particular to mean an element which, for a transmission of drive power, is at least partially looped around a drive element, in particular a drive shaft or the cooling fluid flow-generating element, and can thus be driven by the drive element. The wraparound element may in this case be in the form of a belt (toothed belt, round belt, flat belt or the like), a band, a chain or the like. By means of the configuration according to the disclosure of the power-tool cooling apparatus, it is advantageously possible to realize a smooth and quiet drive. Furthermore, it is advantageously possible for shocks in the drive train to be dampened. Furthermore, substantially maintenance-free operation is advantageously possible.

It is furthermore proposed that the cooling unit has an axis of rotation which is arranged at least substantially parallel and offset with respect to an axis of rotation of the further cooling unit. The cooling fluid flow-generating element of the cooling unit can preferably be driven in rotation about the axis of rotation of the cooling unit. The cooling fluid flow-generating element of the further cooling unit can preferably be driven in rotation about the axis of rotation of the further cooling unit. "Substantially parallel" is to be understood here in particular to mean an orientation of a direction relative to a reference direction, in particular in a plane, wherein the direction deviates from the reference direction by in particular less than 8°, advantageously less than 5° and particularly advantageously less than 2°. By means of the configuration according to the disclosure, it is advantageously possible to realize a compact arrangement of the cooling unit and of the further cooling unit.

In an alternative refinement of the power-tool cooling apparatus according to the disclosure, it is proposed that the cooling unit has an axis of rotation which is arranged at least substantially perpendicular to an axis of rotation of the further cooling unit. "Substantially perpendicular" is to be understood here in particular to mean an orientation of a direction and/or of an axis relative to a reference direction and/or a reference axis, wherein the orientation of the direction and/or of the axis at least differs from an at least substantially parallel orientation with respect to the reference direction and/or with respect to the reference axis, and is in particular skewed or perpendicular with respect to the reference direction and/or with respect to the reference axis. By means of the configuration according to the disclosure, it is advantageously possible for an available installation space of an existing portable power tool to be optimally utilized.

It is furthermore proposed that the further cooling unit, at least for cooling an electronics unit of the portable power tool, is formed at least partially integrally with the electronics unit. The cooling unit is preferably at least partially integrated into a board or a printed circuit board of the electronics unit. By means of the configuration of the power-tool cooling apparatus according to the disclosure, it is advantageously possible to realize reliable cooling of the electronics unit. The electronics unit can advantageously be reliably protected against overheating. It is thus advantageously possible to attain a long service life of the electronics unit.

Also proposed is a portable power tool having a power-tool cooling apparatus according to the disclosure. A "portable power tool" is to be understood here in particular to mean a power tool for machining workpieces, which power tool can be transported by an operator without the use of a transportation machine. The portable power tool has in particular a mass of less than 40 kg, preferably less than 10 kg and particularly preferably less than 5 kg. In this case, the portable power tool may be in the form of a drilling and/or chipping hammer, a percussion drill, an electrically or pneumatically driven screwdriver, a jigsaw, a saber saw, an electrically or pneumatically driven planing machine, an electrically or pneumatically driven grinding machine, or some other portable power tool that appears expedient to a person skilled in the art. In this case, the portable power tool may be of corded or battery-operated design. The portable power tool is preferably in the form of a handheld power tool. By means of the configuration according to the disclosure, it is possible to realize advantageous cooling of components of the portable power tool. In this way, it is advantageously possible to realize a long service life of the portable power tool.

It is furthermore proposed that the portable power tool comprises at least one housing unit on which at least the cooling unit and the further cooling unit are arranged. It is preferable for the cooling unit and the further cooling unit to be arranged in the housing unit. Thus, the housing unit encloses in particular the cooling unit and the further cooling unit. The housing unit may in this case be of a shell type of construction, of pot type of construction or of a combined shell type of construction and pot type of construction. It is particularly preferably the case that the housing unit has at least two housing shell elements which are connected to one another, in particular detachably connectable to one another. By means of the configuration according to the disclosure of the power tool, it is advantageously possible to realize reliable cooling of components of the portable power tool that are arranged in the housing unit.

It is furthermore proposed that the housing unit comprises at least one air inlet region which is assigned at least to the further cooling unit, and comprises at least one further air inlet region which is assigned at least to the cooling unit. In this way, it is advantageously possible for a large flow rate of ambient air to be delivered into the housing unit for cooling purposes. It is thus advantageously possible to realize adequate cooling of components of the portable power tool.

It is furthermore proposed that the air inlet region and the further air inlet region are connected to one another by means of at least one cooling fluid duct of the housing unit. It is thus possible to realize advantageous delivery of cooling fluid for cooling purposes within the housing unit.

The power-tool cooling apparatus according to the disclosure and/or the portable power tool according to the disclosure are/is not intended to be restricted here to the usage and embodiment described above. In particular, in order to realize functionality described herein, the power-tool cooling apparatus according to the disclosure and/or the portable power tool according to the disclosure may have a number of individual elements, components and units that deviates from a number stated herein.

BRIEF DESCRIPTION OF THE DRAWINGS

Further advantages will emerge from the following description of the figures. The figures illustrates six embodiments of the disclosure. The drawing, the description and the claims contain numerous features in combination. A person skilled in the art will expediently also consider the features individually and combine them to form meaningful further combinations.

In the figures:

FIG. 7 shows, in a schematic illustration, a further alternative portable power tool according to the disclosure with a further alternative power-tool cooling apparatus according to the disclosure, which is at least partially integrated into an electronics unit of the portable power tool.

DETAILED DESCRIPTION

Figure 1:
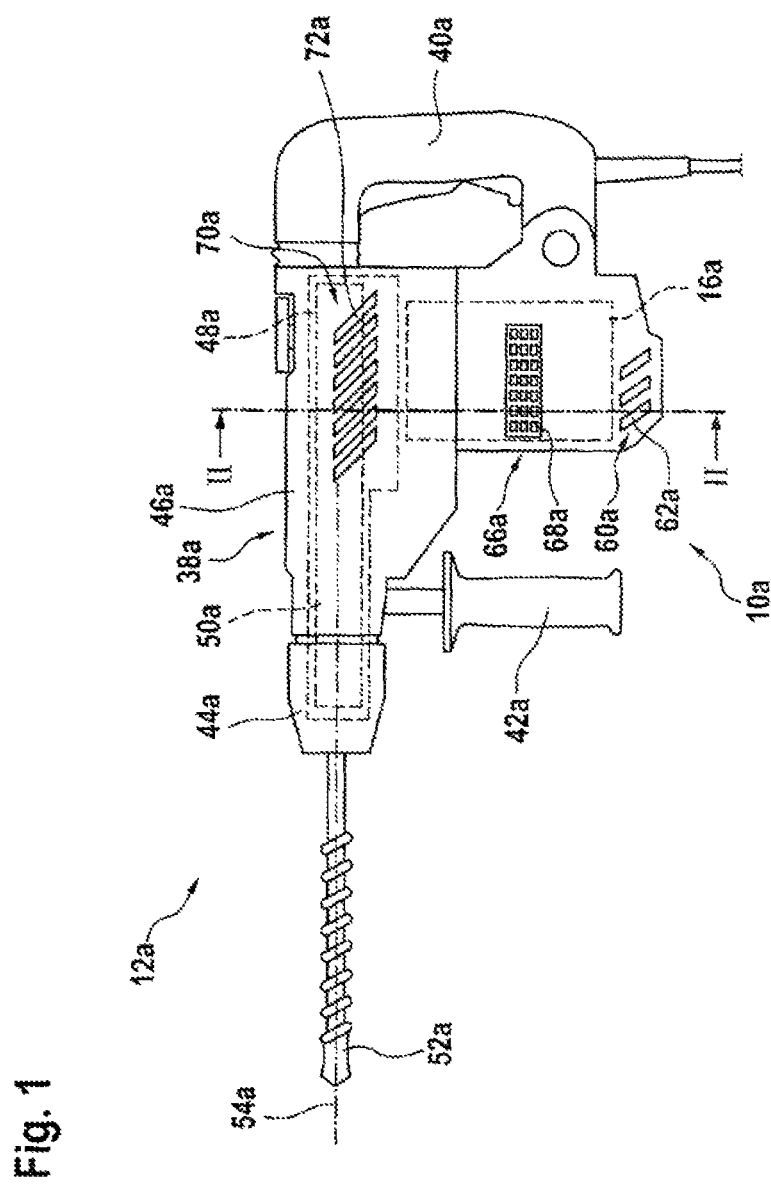
FIG. 1 shows, in a schematic illustration, a portable power tool according to the disclosure having a power-tool cooling apparatus according to the disclosure.

FIG. 1 shows a portable power tool 12*a* with a power-tool cooling apparatus 10*a*. The portable power tool 12*a* is in the form of a drilling and/or chipping hammer. In this case, the portable power tool 12*a* is in the form of a corded drilling and/or chipping hammer. It is however also conceivable for the portable power tool 12*a* to be of some other configuration that appears expedient to a person skilled in the art, and to be configured for example as a battery-operated drilling and/or chipping hammer, a battery-operated drill driver or the like. The portable power tool 12*a* comprises at least one main handle 40*a* and at least one additional handle 42*a*. The main handle 40*a* is arranged on a side of the portable power tool 12*a* which faces away from a tool receptacle 44*a* of the portable power tool 12*a*. In this case, the main handle 40*a* is mounted pivotably on a housing unit 38*a* of the portable power tool 12*a*. A pivot axis of the main handle 40*a* runs at least substantially perpendicular to an axis of rotation 54*a* of the tool receptacle 44*a*.

The housing unit 38*a* is provided for accommodating at least one drive unit 16*a* and at least one output unit 48*a* of the portable power tool 12*a*. The output unit 48*a* comprises a percussive mechanism unit 50*a* for generating a percussive impulse. The drive unit 16*a* and the output unit 48*a* interact, in a manner already known to a person skilled in the art, so as to exert a percussive impulse on the tool receptacle 44*a* and/or on a machining tool 52*a* arranged in the tool receptacle 44*a*. The drive unit 16*a* is in the form of an AC electric motor unit. In an alternative configuration not illustrated in any more detail here, the drive unit 16*a* is in the form of an EC electric motor unit. It is however also conceivable for the drive unit 16*a* to be of some other configuration that appears expedient to a person skilled in the art; in particular, in the case of a battery-operated configuration of the portable power tool 12*a*, the drive unit 16*a* is preferably in the form of a DC electric motor unit. A drive axis of rotation 56*a* of the drive unit 16*a* runs at least substantially perpendicular to the axis of rotation 54*a* of the tool receptacle 44*a*. In this case, the drive axis of rotation 56*a* of the drive unit 16*a* runs at least substantially perpendicular to the axis of rotation 54*a* of the tool receptacle 44*a*.

The housing unit 38*a* is of shell type of construction. Thus, the housing unit 38*a* comprises at least two housing shell elements 46*a*, 64*a* (FIG. 2; only one of the housing shell elements 46*a* is illustrated in FIG. 1) which, in a connecting plane, are detachably connectable to one another in a manner already known to a person skilled in the art. It is however also conceivable for the housing unit 38*a* to be of pot type of construction or to be of a combined shell type of construction and pot type of construction.

Figure 2:
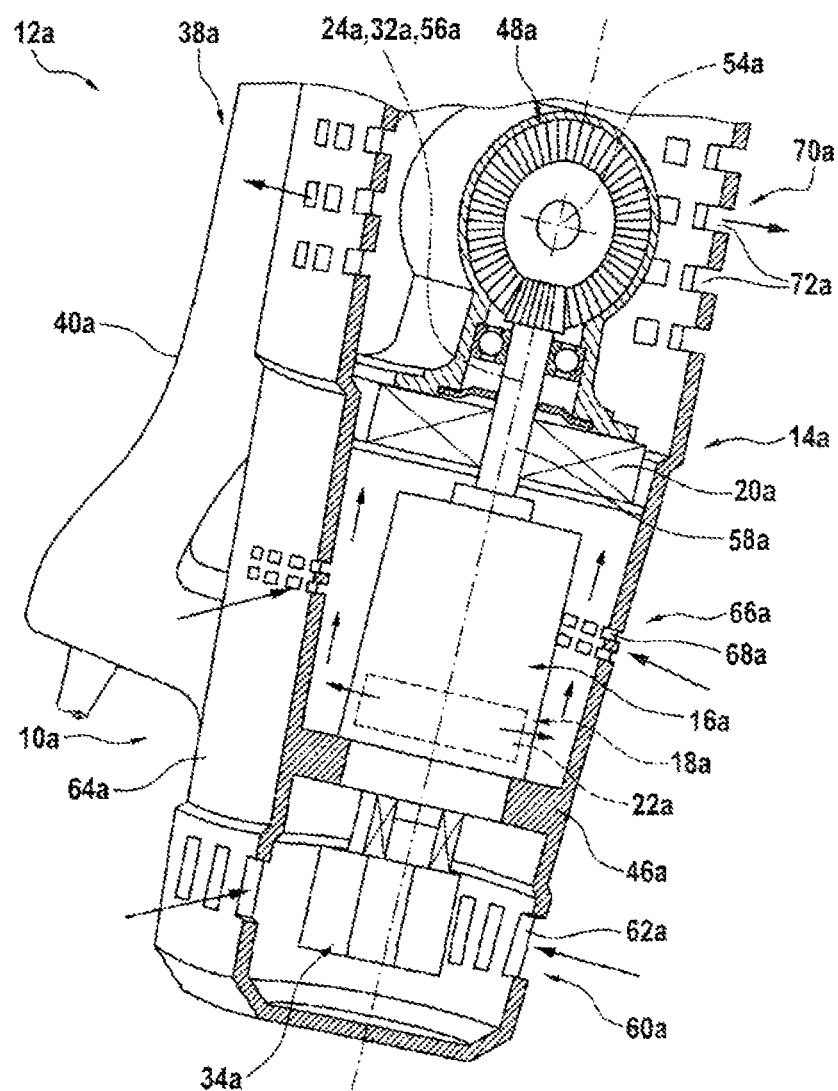
FIG. 2 shows, in a schematic illustration, a detail view of the power-tool cooling apparatus according to the disclosure.

FIG. 2 shows a sectional view of the portable power tool 12*a* along the line II-II in FIG. 1. The sectional view illustrates an arrangement of the power-tool cooling apparatus 10*a*. The power-tool cooling apparatus 10*a* for the portable power tool 12*a* comprises at least one cooling unit 14*a* which generates a cooling fluid flow and which serves at least for cooling the drive unit 16*a* of the portable power tool 12*a*. The cooling unit 14*a* for cooling the drive unit 16*a* forms, in this case, a main cooling unit. The cooling unit 14*a* is in the form of a fan impeller unit. Thus, the cooling unit 14*a* comprises at least one cooling fluid flow-generating element 20*a* which is in the form of a fan impeller and which serves for generating a cooling fluid flow. It is however also conceivable for the cooling fluid flow-generating element 20*a* of the cooling unit 14*a* for generating a cooling fluid flow to be of some other configuration that appears expedient to a person skilled in the art. To generate a cooling fluid flow, the cooling unit 14*a* can be driven by means of the drive unit 16*a*. Here, the cooling fluid flow-generating element 20*a* of the cooling unit 14*a* is arranged on a side of the drive unit 16*a* which faces the output unit 48*a*. For the cooling fluid flow-generating element 20*a* of the cooling unit 14*a* to be driven, the cooling fluid flow-generating element 20*a* is arranged rotationally conjointly on a drive element 58*a* of the drive unit 16*a*. The drive element 58*a* is in the form of a drive shaft of the drive unit 16*a*. Thus, the cooling fluid flow-generating element 20*a* of the cooling unit 14*a* is connected rotationally conjointly to the drive shaft of the drive unit 16*a*.

Furthermore, the power-tool cooling apparatus 10*a* comprises at least one further cooling unit 18*a* which serves for generating a further cooling fluid flow and which is designed so as to differ from the cooling unit 14*a* for cooling the drive unit 16*a*. Here, the further cooling unit 18*a* forms a secondary cooling unit which is provided in addition to the cooling unit 14*a*. The further cooling unit 18*a* is in the form of a fan impeller unit. Thus, the further cooling unit 18*a* comprises at least one cooling fluid flow-generating element 22*a* which is in the form of a fan impeller and which serves for generating a cooling fluid flow. It is however also conceivable for the cooling fluid flow generating element 22*a* of the further cooling unit 18*a* for generating a cooling fluid flow to be of some other configuration that appears expedient to a person skilled in the art. To generate a further cooling fluid flow, the further cooling unit 18*a* can be driven by means of the drive unit 16*a*. Thus, the cooling unit 14*a* and the further cooling unit 18*a* can be driven by means of the drive unit 16*a*. The cooling fluid flow-generating element 22*a* of the further cooling unit 18*a* is in this case connected rotationally conjointly to the drive element 58*a* of the drive unit 16*a*. Furthermore, the cooling fluid flow-generating element 22*a* of the further cooling unit 18*a* is arranged on a side of the drive unit 16*a* which faces away from the output unit 48*a*. Here, the cooling fluid flow-generating element 22*a* of the further cooling unit 18*a* is integrated into the drive unit 16.

Thus, the cooling fluid flow-generating element 22a of the further cooling unit 18a is arranged in a drive unit housing of the drive unit 16a.

The cooling fluid flow-generating element 22a of the further cooling unit 18a is formed separately from the cooling fluid flow-generating element 20a of the cooling unit 14a. Thus, the cooling unit 14a has at least one cooling fluid flow-generating element 20a which is formed separately from a cooling fluid flow-generating element 22a of the further cooling unit 18a. Furthermore, the cooling fluid flow-generating element 22a of the further cooling unit 18a is arranged on the drive element 58a of the drive unit 16a so as to be spaced apart relative to the cooling fluid flow-generating element 20a of the cooling unit 14a. Here, the cooling fluid flow-generating element 22a of the further cooling unit 18a is arranged so as to be spaced apart relative to the cooling fluid flow-generating element 20a of the cooling unit 14a as viewed along an axis of rotation 24a of the cooling unit 14a. Thus, the cooling unit 14a has at least one cooling fluid flow-generating element 20a which, as viewed along an axis of rotation 24a of the cooling unit 14a, is arranged so as to be spaced apart relative to a cooling fluid flow-generating element 22a of the further cooling unit 18a. Thus, the cooling unit 14a and the further cooling unit 18a are arranged so as to be spaced apart axially relative to one another. The axis of rotation 24a of the cooling unit 14a is arranged coaxially with respect to the drive axis of rotation 56a of the drive unit 16a. Here, the drive axis of rotation 56a of the drive unit 16a forms the axis of rotation 24a of the cooling unit 14a, about which the cooling fluid flow-generating element 20a of the cooling unit 14a can be driven in rotation. Furthermore, the drive axis of rotation 56a of the drive unit 16a forms an axis of rotation 32a of the further cooling unit 18a, about which the cooling fluid flow-generating element 22a of the further cooling unit 18a can be driven in rotation. The axis of rotation 24a of the cooling unit 14a is thus oriented coaxially with respect to the axis of rotation 32a of the further cooling unit 18a. Owing to the arrangement of the cooling fluid flow-generating element 20a of the cooling unit 14a and of the cooling fluid flow-generating element 22a of the further cooling unit 18a on the drive element 58a of the drive unit 16a, the drive axis of rotation 56a forms a drive power transmission unit which is provided for connecting the cooling unit 14a in terms of drive to the further cooling unit 18a.

The cooling unit 14a and the further cooling unit 18a are arranged on the housing unit 38a of the portable power tool 12a. In this case, the cooling unit 14a and the further cooling unit 18a are arranged in the housing unit 38a of the portable power tool 12a. Thus, the housing shell elements 46a of the housing unit 38a surround the cooling unit 14a and the further cooling unit 18a. Here, the housing unit 38a comprises at least one air inlet region 60a for enabling cooling fluid flows to be generated by means of the cooling unit 14a and the further cooling unit 18a. The air inlet region 60a comprises at least one air inlet opening 62a. Overall, the air inlet region 60a has a multiplicity of inlet openings 62a which are configured in a manner already known to a person skilled in the art. The air inlet region 60a is in this case arranged on the housing unit 38a at a side of the drive unit 16a which faces away from the output unit 48a. By means of the further cooling unit 18a, in particular by virtue of the cooling fluid flow-generating element 22a of the further cooling unit 18a being driven in rotation, ambient air can be delivered through the air inlet openings 62a of the air inlet region 60a into the housing unit 38a. Thus, a sub-region of the housing unit 38a extending from the air inlet region 60a at least to the drive unit 16a forms a first cooling fluid duct of the power-tool cooling apparatus 10a. An electronics unit 34a of the portable power tool 12a is arranged in said sub-region of the housing unit 38a and thus in the first cooling fluid duct. Thus, the electronics unit 34a is cooled owing to delivery of ambient air by means of the further cooling unit 18a.

Owing to the arrangement of the further cooling unit 18a within the drive unit housing of the drive unit 16a, the ambient air drawn into the housing unit 38a through the air inlet openings 62a of the air inlet region 60a can be delivered into the drive unit housing of the drive unit 16a. In this way, it is advantageously possible for cooling of the drive unit 16a, in particular of a commutator of the drive unit 16a, to be ensured in targeted fashion. The drive unit housing of the drive unit 16a comprises at least one cooling air outlet opening through which ambient air delivered by means of the further cooling unit 18a can emerge from the drive unit housing of the drive unit 16a. The cooling air outlet opening of the drive unit housing of the drive unit 16a is in this case directly connected to a second cooling fluid duct of the power-tool cooling apparatus 10a. The second cooling fluid duct of the power-tool cooling apparatus 10a extends in this case at least from an air inlet region 66a of the housing unit 38a to an air outlet region 70a of the housing unit 38a. The first cooling fluid duct and the second cooling fluid duct may in this case be formed directly adjacent to one another. Thus, the air inlet region 60a and the air inlet region 66a are connected to one another by means of at least one cooling fluid duct of the housing unit 38a. It is however also conceivable for the first cooling fluid duct and the second cooling fluid duct to be formed spatially separately from one another and to each extend separately as far as the air outlet region 70a of the housing unit 38a. The air inlet region 66a of the housing unit 38a comprises at least one air inlet opening 68a. Altogether, the air inlet region 66a has a multiplicity of air inlet openings 68a which are configured in a manner already known to a person skilled in the art. The air inlet region 66a is arranged so as to be spaced apart relative to the air inlet region 60a. In this case, the air inlet region 66a is arranged so as to be spaced apart relative to the air inlet region 60a as viewed along the drive axis of rotation 56a. The air outlet region 70a of the housing unit 38a comprises at least one air outlet opening 72a. Altogether, the air inlet region 66a has a multiplicity of air inlet openings 68a, which are configured in a manner already known to a person skilled in the art. The air outlet region 70a is arranged so as to be spaced apart relative to the air inlet region 66a. Here, the air outlet region 70a is arranged so as to be spaced apart relative to the air inlet region 66a as viewed along the drive axis of rotation 56a. Thus, the housing unit 38a comprises at least one air inlet region 60a, to which at least the further cooling unit 18a is assigned, and at least one air inlet region 66a, to which at least the cooling unit 14a is assigned.

By means of the cooling unit 14a, in particular by virtue of the cooling fluid flow-generating element 20a of the cooling unit 14a being driven in rotation, ambient air can be delivered through the air inlet openings 68a of the air inlet region 66a into the housing unit 38a, which ambient air can be mixed by means of the ambient air which emerges from the drive unit housing of the drive unit 16a and which has previously been delivered by means of the further cooling unit 18a. It is thus advantageously possible for a high total flow rate of ambient air, which can be delivered through the housing unit 38a for cooling purposes, to be delivered by means of the cooling unit 14a and the further cooling unit 18a; this can be utilized for advantageous cooling of components of the portable power tool 12a that are arranged within the housing unit 38a, for example the drive unit 16a, the electronics unit 64a, the percussive mechanism unit 50a or the like.

FIGS. 3 to 7 show further embodiments of the disclosure. The following descriptions and the drawings are restricted substantially to the differences between the embodiments, wherein, with regard to components of identical designation, in particular with regard to components with identical reference signs, reference may basically also be made to the drawings and/or the description of the other embodiments, in particular FIGS. 1 and 2. For distinction between the embodiments, the alphabetic character a is provided as an affix to the reference signs of the embodiment in FIGS. 1 and 2. In the embodiments of FIGS. 3 to 7, the alphabetic character a has been replaced by the alphabetic characters b to f.

Figure 3:
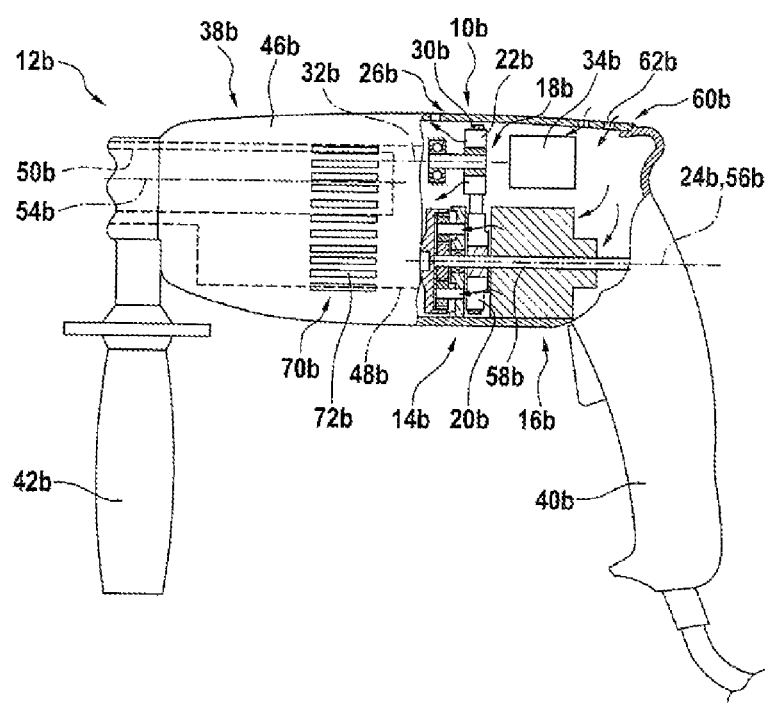
FIG. 3 shows, in a schematic illustration, an alternative portable power tool according to the disclosure with an alternative power-tool cooling apparatus according to the disclosure, which comprises a drive power transmission unit.

FIG. 3 shows an alternative portable power tool 12b with an alternative power-tool cooling apparatus 10b. The portable power tool 12b is in the form of a percussion drill. It is however also conceivable for the portable power tool 12b to be of some other configuration that appears expedient to a person skilled in the art. The portable power tool 12b has a housing unit 38b which is provided for surrounding a drive unit 16b and an output unit 48b. The housing unit 38b is of shell type of construction. Thus, the housing unit 38b comprises at least two housing shell elements 46b (only one of the housing shell elements 46b is illustrated in FIG. 3) which, in a connecting plane, are detachably connectable to one another in a manner already known to a person skilled in the art. It is however also conceivable for the housing unit 38b to be of pot type of construction or to be of a combined shell type of construction and pot type of construction. The portable power tool 12b furthermore comprises a main handle 40b which is formed integrally with the housing unit 38b. Furthermore, the portable power tool 12b comprises an additional handle 42b that can be arranged detachably on the housing unit 38b.

The output unit 48b comprises a percussive mechanism unit 50b for generating a percussive impulse. The drive unit 16b and the output unit 48b interact, in a manner already known to a person skilled in the art, so as to exert a percussive impulse on a tool receptacle 44b of the portable power tool 12b and/or on a machining tool (not illustrated in any more detail here) arranged in the tool receptacle 44b. The drive unit 16b is in the form of a DC electric motor unit. In an alternative configuration not illustrated in any more detail here, the drive unit 16b is in the form of an EC electric motor unit. It is however also conceivable for the drive unit 16b to be of some other configuration that appears expedient to a person skilled in the art. A drive axis of rotation 56b of the drive unit 16b runs at least substantially parallel to an axis of rotation 54b of the tool receptacle 44b.

The power-tool cooling apparatus 10b illustrated in FIG. 3 for the portable power tool 12b has at least one cooling unit 14b which generates a cooling fluid flow and which serves at least for cooling the drive unit 16b of the portable power tool 12b. Furthermore, the power-tool cooling apparatus 10b has at least one further cooling unit 18b which serves for generating a further cooling fluid flow and which is designed so as to differ from the cooling unit 14b for cooling the drive unit 16b. The cooling unit 14b and the further cooling unit 18b are arranged on the housing unit 38b. In this case, the cooling unit 14b and the further cooling unit 18b are arranged in the housing unit 38b. The further cooling unit 18b is provided in particular for cooling an electronics unit 34b, arranged in the housing unit 38b, of the portable power tool 12b.

The cooling unit 14b and the further cooling unit 18b are each in the form of fan impeller units. In this case, the cooling unit 14b has at least one cooling fluid flow-generating element 20b which is formed separately from a cooling fluid flow-generating element 22b of the further cooling unit 18b. The cooling fluid flow-generating element 20b of the cooling unit 14b and the cooling fluid flow-generating element 22b of the further cooling unit 18b are each in the form of fan impellers. In this case, the cooling fluid flow-generating element 20b of the cooling unit 14b and the cooling fluid flow-generating element 22b of the further cooling unit 18b are arranged so as to be spaced apart relative to one another as viewed along a at least substantially perpendicular to a drive axis of rotation 56b of the drive unit 16b. The cooling unit 14b and the further cooling unit 18b can be driven by means of the drive unit 16b. In this case, the cooling fluid flow-generating element 20b of the cooling unit 14b is connected rotationally conjointly to a drive element 58b of the drive unit 16b. Thus, the drive axis of rotation 56b of the drive unit 16b forms an axis of rotation 24b of the cooling unit 14b.

Furthermore, the power-tool cooling apparatus 10b comprises at least one drive power transmission unit 26b which is provided for connecting the cooling unit 14b in terms of drive to the further cooling unit 18b. In this case, the drive power transmission unit 26b has at least one wraparound element 30b for connecting the cooling unit 14b in terms of drive to the further cooling unit 18b. For a connection in terms of drive between the cooling unit 14b and the further cooling unit 18b, the wraparound element 30b is looped at least partially around the cooling fluid flow-generating element 20b of the cooling unit 14b and the cooling fluid flow-generating element 22b of the further cooling unit 18b. Thus, the cooling fluid flow-generating element 20b of the cooling unit 14b and the cooling fluid flow-generating element 22b of the further cooling unit 18b are connected to one another in terms of drive by means of the wraparound element 30b. The cooling unit 14b has the axis of rotation 24b, which is arranged at least substantially parallel and offset with respect to an axis of rotation 32b of the further cooling unit 18b. With regard to further features and functions of the power-tool cooling apparatus 10b illustrated in FIG. 3, reference may be made to the description of the power-tool cooling apparatus 10a described in FIGS. 1 and 2.

Figure 4:
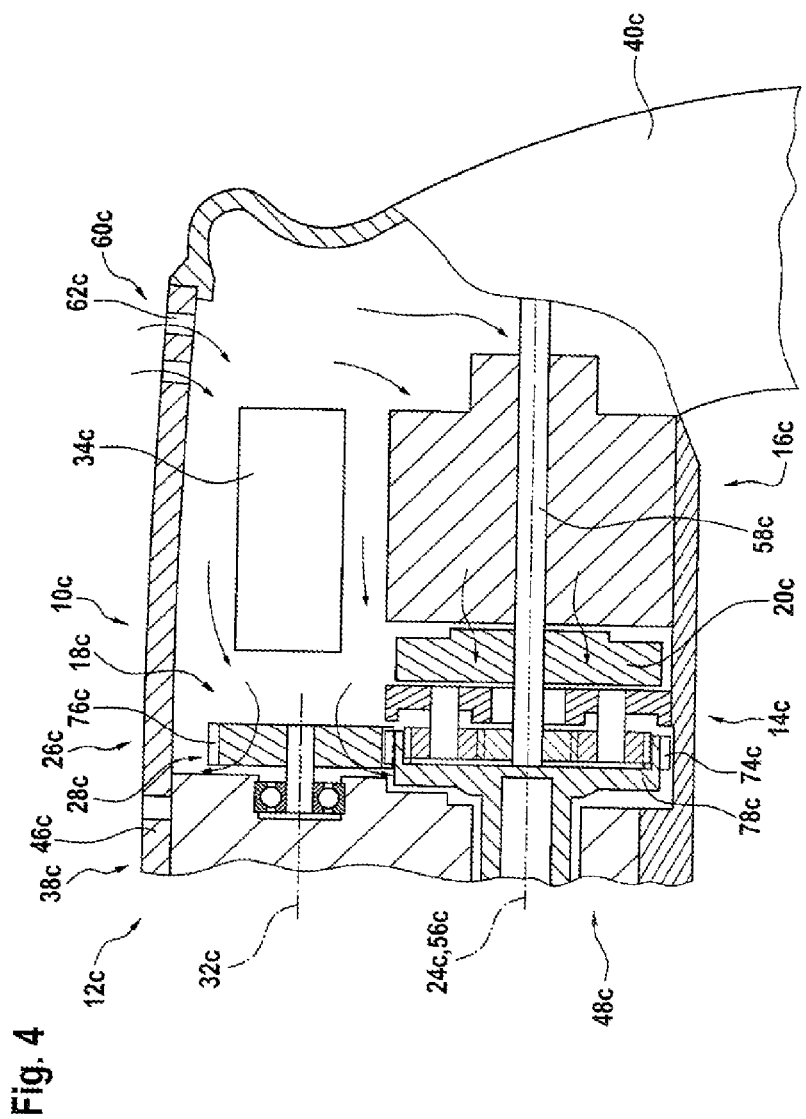
FIG. 4 shows, in a schematic illustration, a further alternative portable power tool according to the disclosure with a further alternative power-tool cooling apparatus according to the disclosure, which comprises an alternative drive power transmission unit.

FIG. 4 shows an alternative portable power tool 12c with an alternative power-tool cooling apparatus 10c, which comprises at least one cooling unit 14c which generates a cooling fluid flow and which serves at least for cooling a drive unit 16c of the portable power tool 12c, and at least one further cooling unit 18c which serves for generating a further cooling fluid flow and which is designed to differ from the cooling unit 14c for cooling the drive unit 16c. The portable power tool 12c illustrated in FIG. 4 is of at least substantially analogous configuration to the portable power tool 12b described in FIG. 3. The power-tool cooling apparatus 10c illustrated in FIG. 4 is of an at least substantially analogous configuration to the power-tool cooling apparatus 10b illustrated in FIG. 3. By contrast to the power-tool cooling apparatus 10b illustrated in FIG. 3, the power-tool cooling apparatus 10c illustrated in FIG. 4 has at least one drive power transmission unit 26c which is provided for connecting the cooling unit 14c in terms of drive to the further cooling unit 18c, wherein the drive power transmission unit 26c has at least one toothing 28c for connecting the cooling unit 14c in terms of drive to the further cooling unit 18c. In this case, the drive power transmission unit 26c comprises at least one toothing element 74c which is formed integrally with a gearing element 78c of an output unit 48c of the portable power tool 12c. The gearing element 78c is in the form of a planetary gearing element, in particular in the form of an internal gear, of the output unit 48c, which is at least partially in the form of a planetary gearing. Furthermore, the drive power transmission unit 26c comprises at least one further toothing element 76c which is formed integrally with a cooling fluid flow-generating element 22c of the further cooling unit 18c. The further toothing element 76c is arranged on an outer circumference of the cooling fluid flow-generating element 22c, which is in the form of a fan impeller, of the further cooling unit 18c. In this case, for the rotational drive of the further cooling unit 18c, in particular of the cooling fluid flow-generating element 22c of the further cooling unit 18c, the toothing element 74c meshes with the further toothing element 76c. With regard to further features and functions of the power-tool cooling apparatus 10c illustrated in FIG. 4, reference may be made to the description of the power-tool cooling apparatus 10a described in FIGS. 1 and 2.

Figure 5:
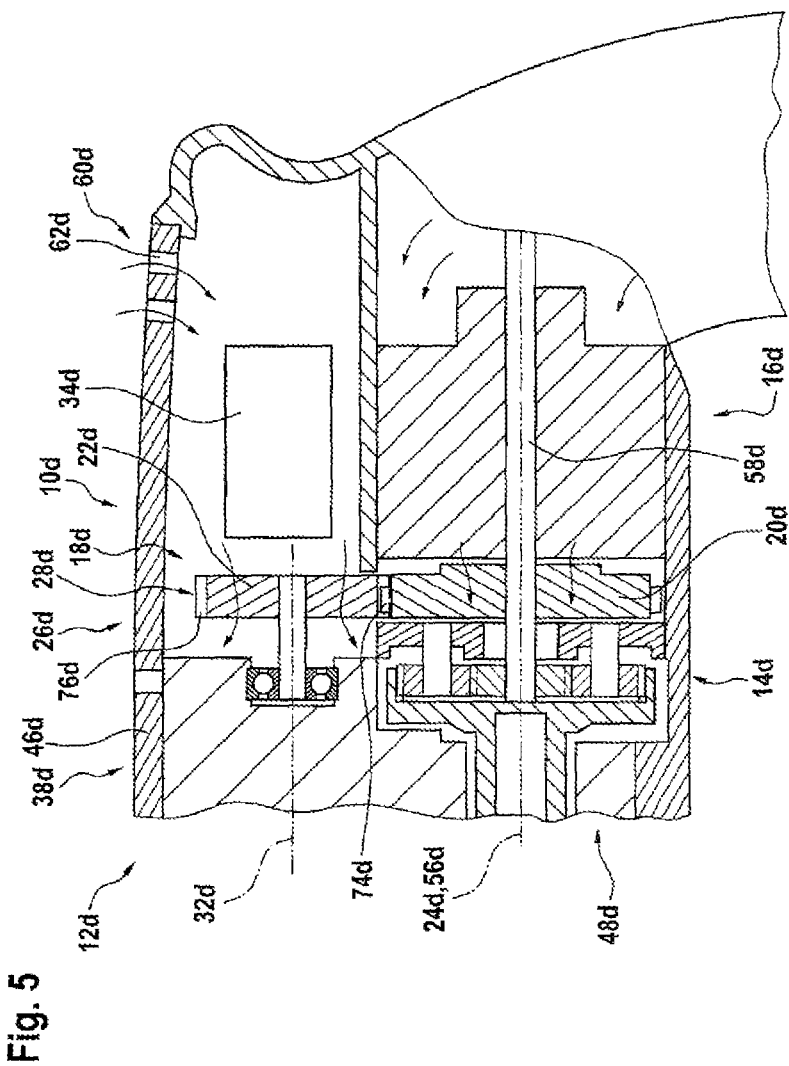
FIG. 5 shows, in a schematic illustration, a further alternative portable power tool according to the disclosure with a further alternative power-tool cooling apparatus according to the disclosure, which comprises at least two separate cooling fluid ducts.

FIG. 5 shows an alternative portable power tool 12d with an alternative power-tool cooling apparatus 10d, which comprises at least one cooling unit 14d which generates a cooling fluid flow and which serves at least for cooling a drive unit 16d of the portable power tool 12d, and at least one further cooling unit 18d which serves for generating a further cooling fluid flow and which is designed to differ from the cooling unit 14d for cooling the drive unit 16d. The portable power tool 12d illustrated in FIG. 5 is of at least substantially analogous configuration to the portable power tool 12b described in FIG. 3. The power-tool cooling apparatus 10d illustrated in FIG. 5 is of an at least substantially analogous configuration to the power-tool cooling apparatus 10b illustrated in FIG. 3. By contrast to the power-tool cooling apparatus 10b illustrated in FIG. 3, the power-tool cooling apparatus 10d illustrated in FIG. 5 has at least one drive power transmission unit 26d which is provided for connecting the cooling unit 14d in terms of drive to the further cooling unit 18d, wherein the drive power transmission unit 26d has at least one toothing 28d for connecting the cooling unit 14d in terms of drive to the further cooling unit 18d. In this case, the drive power transmission unit 26d comprises at least one toothing element 74d which is formed integrally with a cooling fluid flow-generating element 20d of the cooling unit 14d. The toothing element 74d is arranged on an outer circumference of the cooling fluid flow-generating element 20d, which is in the form of a fan impeller, of the cooling unit 14d. Furthermore, the drive power transmission unit 26d comprises at least one further toothing element 76d which is formed integrally with a cooling fluid flow-generating element 22d of the further cooling unit 18d. The further toothing element 76d is arranged on an outer circumference of the cooling fluid flow-generating element 22d, which is in the form of a fan impeller, of the further cooling unit 18d. In this case, for the rotational drive of the further cooling unit 18d, in particular of the cooling fluid flow-generating element 22d of the further cooling unit 18d, the toothing element 74d meshes with the further toothing element 76d. The cooling unit 14d is arranged in a first cooling fluid duct of the power-tool cooling apparatus 10d. The further cooling unit 18d is arranged in a further cooling fluid duct of the power-tool cooling apparatus 10d. In this case, the first cooling fluid duct and the further cooling fluid duct are arranged spatially separately from one another in the housing unit 38d. With regard to further features and functions of the power-tool cooling apparatus 10d illustrated in FIG. 5, reference may be made to the description of the power-tool cooling apparatus 10a described in FIGS. 1 and 2.

Figure 6:
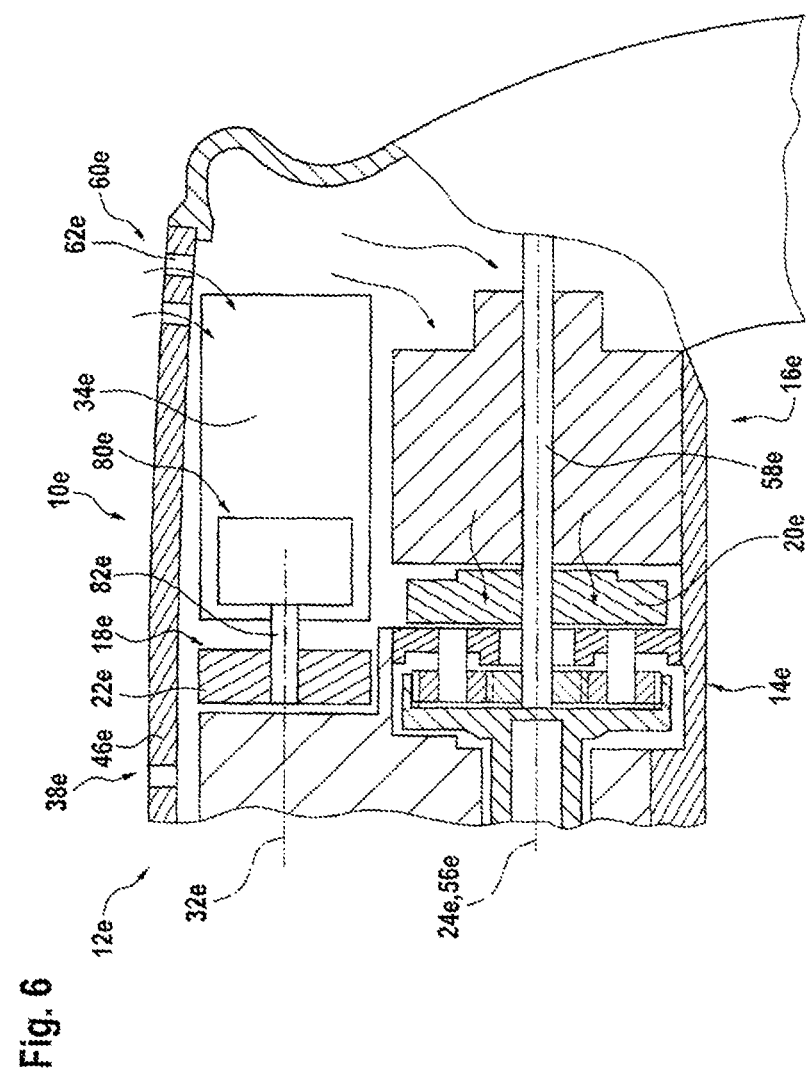
FIG. 6 shows, in a schematic illustration, a further alternative portable power tool according to the disclosure with a further alternative power-tool cooling apparatus according to the disclosure, which is at least partially integrated into an electronics unit of the portable power tool.

FIG. 6 shows an alternative portable power tool 12e with an alternative power-tool cooling apparatus 10e, which comprises at least one cooling unit 14e which generates a cooling fluid flow and which serves at least for cooling a drive unit 16e of the portable power tool 12e, and at least one further cooling unit 18e which serves for generating a further cooling fluid flow and which is designed to differ from the cooling unit 14e for cooling the drive unit 16e. The portable power tool 12e illustrated in FIG. 6 is of at least substantially analogous configuration to the portable power tool 12b described in FIG. 3. The power-tool cooling apparatus 10e illustrated in FIG. 6 is of an at least substantially analogous configuration to the power-tool cooling apparatus 10b illustrated in FIG. 3. By contrast to the power-tool cooling apparatus 10b illustrated in FIG. 3, the power-tool cooling apparatus 10e illustrated in FIG. 6 has the further cooling unit 18e which, at least for cooling an electronics unit 34e of the portable power tool 12e, is formed at least partially integrally with the electronics unit 34e. In this case, the electronics unit 34e has at least one cooling unit drive unit 80e which is provided for driving the further cooling unit 18e. The cooling unit drive unit 80e is formed separately from the drive unit 16e of the portable power tool 12e. In this case, the cooling unit drive unit 80e is in the form of an electric motor unit. It is however also conceivable for the cooling unit drive unit 80e to be of some other configuration that appears expedient to a person skilled in the art. A cooling fluid flow-generating element 22e of the further cooling unit 18e is arranged rotationally conjointly with a drive element 82e of the cooling unit drive unit 80e. The cooling fluid flow-generating element 22e of the further cooling unit 18e is in the form of a fan impeller. In this case, the cooling fluid flow-generating element 22e of the further cooling unit 18e can be driven in rotation by means of the cooling unit drive unit 80e.

The cooling unit 14e, in particular a cooling fluid flow-generating element 20e of the cooling unit 14e, has an axis of rotation 24e which is arranged so as to be at least substantially parallel and offset with respect to an axis of rotation 32e of the further cooling unit 18e, in particular of the cooling fluid flow-generating element 22e of the further cooling unit 18e. Thus, the cooling unit 14e is arranged in the housing unit 38e so as to be spaced apart relative to the further cooling unit 18e. With regard to further features and functions of the power-tool cooling apparatus 10e illustrated in FIG. 6, reference may be made to the description of the power-tool cooling apparatus 10a described in FIGS. 1 and 2.

FIG. 7 shows an alternative portable power tool 12f with an alternative power-tool cooling apparatus 10f, which comprises at least one cooling unit 14f which generates a cooling fluid flow and which serves at least for cooling a drive unit 16f of the portable power tool 12f, and at least one further cooling unit 18f which serves for generating a further cooling fluid flow and which is designed to differ from the cooling unit 14f for cooling the drive unit 16f. The portable power tool 12f illustrated in FIG. 7 is of at least substantially analogous configuration to the portable power tool 12b described in FIG. 3. The power-tool cooling apparatus 10f illustrated in FIG. 7 is of an at least substantially analogous configuration to the power-tool cooling apparatus 10e illustrated in FIG. 6. By contrast to the power-tool cooling apparatus 10e illustrated in FIG. 6, the power-tool cooling apparatus 10f illustrated in FIG. 7 has the cooling unit 14f, which has an axis of rotation 24f which is arranged at least substantially perpendicular to an axis of rotation 32f of the further cooling unit 18f. Furthermore, the power-tool cooling apparatus 10f has at least one additional cooling unit 84f which is provided for generating a cooling fluid flow. The additional cooling unit 84f is in this case formed separately from the cooling unit 14f and from the further cooling unit 18f. The additional cooling unit 84f is integrated into a further electronics unit 36f of the portable power tool 12f. In this case, the additional cooling unit 84f is in the form of a fan impeller unit. It is however also conceivable for the additional cooling unit 84f to be of some other configuration that appears expedient to a person skilled in the art. The further electronics unit 36f of the portable power tool 12f is arranged in a main handle 40f of the portable power tool 12f. Thus, at least one air inlet region 60f of a housing unit 38f of the portable power tool 12f is arranged in the main handle 40f. An air outlet region 70f of the housing unit 38f is connected to the air inlet region 60f by means of a first cooling fluid duct of the power-tool cooling apparatus 10f. In this case, at least the further cooling unit 18f and the additional cooling unit 84f are arranged in the first cooling fluid duct. The additional cooling unit 84f is provided for delivering ambient air into the housing unit 38f through air inlet openings 62f of the air inlet region 60f. The further cooling unit 18f is provided for delivering the ambient air, which has been delivered into the housing unit 38f by means of the additional cooling unit 84f, out of the housing unit 38f through air outlet openings 72f of the air outlet region 70f. With regard to further features and functions of the power-tool cooling apparatus 10f illustrated in FIG. 7, reference may be made to the description of the power-tool cooling apparatus 10a described in FIGS. 1 and 2.

What is claimed is:

1. A power-tool cooling apparatus for a portable power-tool, comprising:
    a first fan configured to generate a first cooling fluid flow to cool a drive unit of the portable power tool by drawing fluid from a first air inlet region;
    a second fan configured to generate a second cooling fluid flow by drawing fluid from a second air inlet region; and
    at least one housing unit defining at least in part a cooling fluid duct configured to direct at least a portion of the first fluid flow from the first fan to the second air inlet region,
    wherein the second fan is designed to differ from the first fan,
    the power-tool is configured such that the first cooling fluid flow and the second cooling fluid flow are mixed with each other within the power-tool cooling apparatus, and
    the cooling fluid duct is located at least in part between the at least one housing unit and the drive unit.

2. The power-tool cooling apparatus according to claim 1, wherein:
    the first fan includes at least one first fan impeller;
    the second fan includes at least one second fan impeller, wherein the at least one first fan impeller is configured to be separate from the at least one second fan impeller.

3. The power-tool cooling apparatus according to claim 2, wherein the at least one first fan impeller is spaced apart from the at least one second fan impeller with respect to an axis of rotation defined by the first fan.

4. The power-tool cooling apparatus according to claim 1, wherein the first fan and the second fan are configured to be driven by the drive unit of the power tool.

5. The power-tool cooling apparatus according to claim 1, further comprising at least one drive power transmission unit operably connecting the first fan to the second fan.

6. The power-tool cooling apparatus according to claim 5, wherein the at least one drive power transmission unit includes at least one toothing configured to operably connect the first fan to the second fan.

7. The power-tool cooling apparatus according to claim 5, wherein the at least one drive power transmission unit includes at least one wraparound element configured to operably connect the first fan to the second fan.

8. The power-tool cooling apparatus according to claim 1, wherein the first fan defines an axis of rotation that is at least substantially parallel to and offset from an axis of rotation defined by the second fan.

9. The power-tool cooling apparatus according to claim 1, wherein the first fan defines an axis of rotation that is substantially perpendicular to an axis of rotation defined by the second fan.

10. The power-tool cooling apparatus according to claim 1, wherein the second fan is formed integrally with an electronics unit of the portable power tool, and configured and arranged to cool the electronics unit.

11. The power-tool cooling apparatus for a portable power-tool of claim 1, further comprising:
    a drive unit housing located within the at least one housing unit, the drive unit housed at least partially by the drive unit housing, wherein
    the first fan is arranged in the drive unit housing, and
    the second fan is arranged outside of the drive unit housing.

12. The power-tool cooling apparatus for a portable power-tool of claim 11, wherein the drive unit housing comprises at least one cooling air inlet and at least one cooling air outlet.

13. A portable power tool, comprising:
    a drive unit;
    a power-tool cooling apparatus including: (i) a first fan configured to generate a first cooling fluid flow by drawing fluid from a first air inlet region to cool the drive unit; and (ii) a second fan configured to generate a second cooling fluid flow by drawing fluid from a second air inlet region; and
    at least one housing unit defining at least in part a cooling fluid duct configured to direct at least a portion of the first fluid flow from the first fan to the second air inlet region,
    wherein the second fan is designed to differ from the first fan,
    the power-tool is configured such that the first cooling fluid flow and the second cooling fluid flow are mixed with each other within the power tool, and
    the cooling fluid duct is located at least in part between the at least one housing unit and the drive unit.

14. The portable power tool according to claim 13, wherein the first fan and the second fan are positioned in the at least one housing unit.

15. The portable power tool according to claim 14, wherein:
    the at least one housing unit defines the first air inlet region and second air inlet region.

16. The portable power tool of claim 13, wherein:
    the drive unit is housed at least partially by a drive unit housing located within the at least one housing unit;

the first fan is arranged in the drive unit housing; and the second fan is arranged outside of the drive unit housing.

17. The portable power tool of claim 16, wherein the drive unit housing comprises at least one cooling air inlet and at least one cooling air outlet.

18. A portable power tool, comprising:

a housing;

a drive unit, wherein the drive unit comprises a drive unit housing located within the housing of the portable power tool; and a power-tool cooling apparatus including: (i) at least a first fan configured to generate a first cooling fluid flow to cool the drive unit; and (ii) a second fan configured to generate a second cooling fluid flow, wherein the second fan is designed to differ from the first fan, the power-tool is configured such that the first cooling fluid flow and the second cooling fluid flow are mixed with each other at a location within the power tool, the first fan is arranged in the drive unit housing, the second fan is arranged outside of the drive unit housing, and a cooling duct located at least in part between the housing and the drive unit is configured to direct at least a portion of the first fluid flow from the first fan to the location.

19. The portable power tool of claim 18, wherein the drive unit housing comprises at least one cooling air inlet and the housing of the portable power tool comprises at least one air outlet opening.

* * * * *